Feb. 13, 1945. G. W. COOK 2,369,138
COUPLING MEANS
Filed Oct. 5, 1943
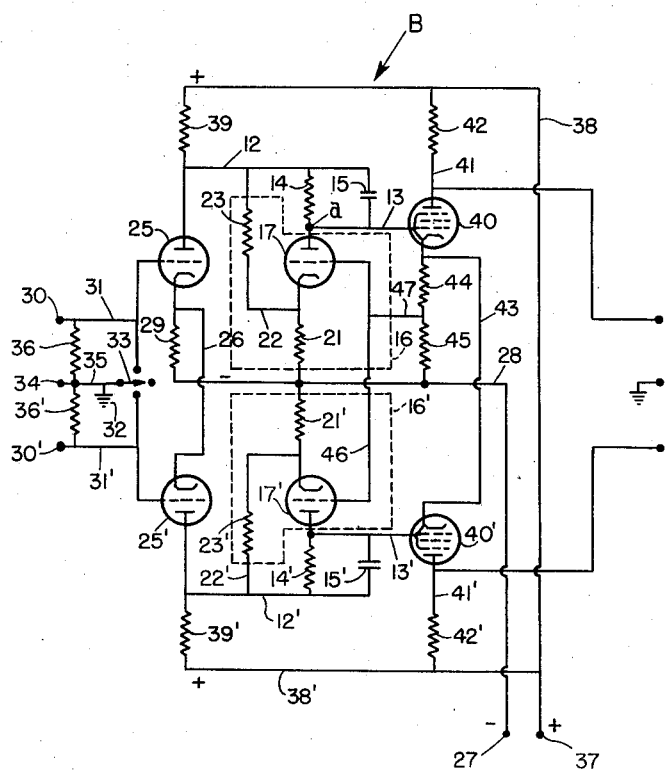
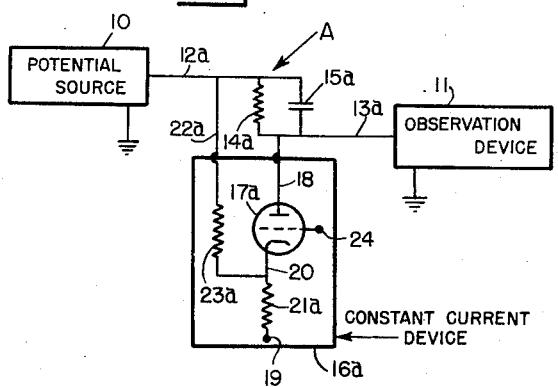
INVENTOR.
George W. Cook
BY
HIS ATTORNEY Patented Feb. 13, 1945

2,369,138

UNITED STATES PATENT OFFICE 2,369,138

COUPLING MEANS

George W. Cook, Washington, D. C.

Application October 5, 1943, Serial No. 505,003

10 Claims. (Cl. 179—171)

(Granted under the act of March 3, 1883, as amended April 30, 1928; 370 O. G. 757)

The invention relates to improvements in coupling means useful in the amplification or observation of changes in direct or alternating currents or voltages.

The conventional resistance-capacitance coupled amplifier having a condenser in series between the plate of the driving tube and the grid of the driven tube eliminates the direct component of the output signal and therefore destroys the response of the amplifier to signals of zero frequency.

The use of a battery for interstage coupling in an amplifier is generally unsatisfactory because of its capacity to other circuit elements and inherent instability of terminal voltage.

A conventional resistance coupling produces attenuation of the signal and is subject to instability.

An important object of the present invention is to provide an improved amplifier for alternating and direct currents or voltages.

Another object of the invention is the provision of an amplifier of the character described which is self-stabilizing in that it is little affected by changes in power supply potentials, ambient temperature, tube characteristics, etc.

A further object is to provide an improved direct current amplifier wherein input and/or output signals may vary about any desired potential, including ground potential.

A still further object is the provision of a direct and alternating current amplifier having high frequency characteristics substantially equal to those of a conventional resistance-capacity coupled amplifier.

The invention also aims to provide means for maintaining a zero signal potential drop across an impedance where a change in average potential level is permitted to occur, usually from a higher to a lower level.

The invention further aims to provide an improved device for the transformation of signal voltages from a higher to a lower level.

Other objects and advantages of the invention will become apparent during the course of the following detailed description, taken in connection with the accompanying drawing, forming a part of this specification, and in which drawing, Figure 1 is a diagrammatic view of an electrical testing system utilizing the coupling means.

Figure 2 is a diagrammatic view of a self-stabilized direct and alternating current amplifier utilizing the coupling means.

In the drawing, which shows alternate forms of the invention, and wherein similar reference characters denote corresponding parts throughout the views, the letter A designates the electrical testing system and B, the self-stabilized amplifier.

Referring first to the testing system A shown in Figure 1, the same includes a potential source 10 providing signal variations which are small in magnitude relative to the total output potential, and which variations it is desired to observe, independently of the total average output potential. A specific example of such a potential source 10 is a direct current generator having a commutator "ripple" which is to be investigated. Any suitable observation device 11, such as a vacuum tube voltmeter or a cathode ray oscillograph, may be employed.

Serially connected between the output conductor 12a of the potential source 10 and the input conductor 13a of the device 11 is a resistor 14a which may or may not be shunted with a condenser 15a, depending on the characteristics of the signal to be investigated. Associated with the elements just described is any suitable constant current device 16a which, in the example shown, includes a high vacuum triode tube 17a, commercially known as type 12J5. A conductor 18 connects the anode of the tube 17a to the input conductor 13a. Extending between the cathode of the tube 17a and terminal 19 of an electrode potential source which is at zero signal-potential is a conductor 20 provided with a cathode-load resistor 21a. Extending between the cathode of the tube 17a and the output conductor 12a of the potential source 10 is a conductor 22a provided with a resistor 23a. The control grid of the tube is connected to the terminal 24 of a source of fixed operating potential.

In the operation of the testing system A, the constant current device 16a serves to provide a constant flow of current through the resistor 14a regardless of potential changes on the conductor 12a. Thus variations in signal potentials on the conductor 12a will appear on the conductor 13a in exactly the same magnitude and phase, and the potential drop across the resistor will produce the desired change in signal-potential levels without attenuating the signal itself. The value of the resistor 14a or the value of the constant current may be adjusted to provide a wide range of variations in the average potential-level drop. In the specific constant current device 16a, the anode current of the tube 17a is held constant by varying the cathode potential of the tube 17a and thereby changing the internal anode resistance of the tube by an amount just sufficient to compensate for any tendency of the anode current to change in response to variations in potential on the conductor 12a. This is accomplished by providing the resistor 23a to develop the necessary control potential at the cathode of the tube 17a. The value of the resistor 23a is so chosen that, when the resistors 21a, 23a act as a voltage divider across the potential present between the conductor 12a and the terminal 19, the potential drop across the resistor 21a with constant anode current also flowing through the resistor 21a, is just sufficient to vary the internal anode resistance of the tube 17a by an amount to prevent any change in anode current. In the form of constant current device 16a shown in Figure 1, the correct value of the resistor 23a for constant anode current is equal to $\mu$ times the value of the resistor 21a, where $\mu$ is the amplification factor of the tube 17a under its operating conditions in the circuit. The terminal 19 is held at a potential suitable for operation of the tube 17a on the desirable part of its operating characteristic and suitable for the desired value of constant anode current. This potential is usually a few volts negative with respect to the cathode of the tube 17a. It will thus be seen that the testing system A utilizes a constant current device in combination with an impedance to produce a change in average signal-potential level without introducing attenuation of the signal itself.

Referring now to the self-stabilized amplifier B, the same is shown in Figure 2 as a two-stage push-pull amplifier, but the number of stages which can be cascaded is limited only by the demands for economical power-supply design and by the noise introduced by the first stage.

The amplifier B in its first stage includes two high vacuum triode tubes 25, 25', combined in a single envelope and known commercially as type 12SC7. The cathodes of these tubes 25, 25' are connected as by a conductor 26. Extending between this conductor 26 and the negative terminal 27 of a source of high voltage is a conductor 28 provided with a cathode-load resistor 29. Connecting the control grids of the tubes 25, 25' with the signal input terminals 30, 30' of the amplifier are conductors 31, 31', either of which may be grounded at 32, as by a single pole, three position switch 33, having a neutral position permitting acceptance of balanced signals. An additional signal input terminal 34 is connected to the ground 32 by a conductor 35, which is in turn connected to the conductors 31, 31' by grid resistors 36, 36'. Connected between the anodes of the tubes 25, 25' and the positive terminal 37 of the high voltage supply are conductors 38, 38' provided with resistors 39, 39' for effecting amplification in the usual manner.

The second stage of the amplifier includes two high vacuum pentode tubes 40, 40', commercially known as type 6F6, having their anodes connected to the conductors 38, 38', as by conductors 41, 41' provided with resistors 42, 42'. The cathodes of the tubes 40, 40' are connected by a conductor 43 which in turn is connected to the negative power supply conductor 28 through a voltage divider comprising resistors 44, 45.

Connected to the anodes of the tubes 25, 25' are first stage output conductors 12, 12', similar to the output conductor 12a for the potential source 10 of Figure 1. Connected to the control grids of the tubes 40, 40' are second stage input conductors 13, 13', similar to the input conductor 13a for the observation device 11 of Figure 1. The output conductors 12, 12' are connected to the input conductors 13, 13' through resistors 14, 14', similar to the resistor 14a of Figure 1. These resistors 14, 14' may or may not be shunted by condensers 15, 15'.

Associated with the resistors 14, 14' are constant current devices 16, 16', including tubes 17, 17', resistors 21, 21', and resistors 23, 23', respectively similar to the tube 17a, resistor 21a and resistor 23a shown in Figure 1 and operating in the same manner.

Instead of connecting the control grids of the tubes 17, 17' to a fixed point 24 of zero signal potential as in Figure 1, I prefer to connect the control grids of these tubes 17, 17' in parallel as by a conductor 46 which is in turn connected between the resistors 44, 45 of the voltage divider, as by a conductor 47. The relative values of the resistors 44, 45 are so chosen that the average control grid potential of the tubes 17, 17' will be suitable for their proper operation.

Between the input terminals 30, 30', 34 and the conductors 12, 12', the circuit consists of a conventional single stage push-pull amplifier arranged for acceptance of input signals in either balanced or unbalanced condition with respect to ground. With the exception of the arrangement provided by the conductor 47 and the resistors 44, 45, the circuit extending beyond the conductors 13, 13' is a conventional push-pull amplifier stage. The elements interposed between the tubes 25, 25' of the first stage and the tubes 40, 40' of the succeeding stage constitute coupling means which operates to produce the same effect as a direct coupling between the tubes 25, 25' and the tubes 40, 40', by transferring unattenuated signals from the average potential levels of the anodes of the tubes 25, 25' to the average voltage levels of the control grids of the tubes 40, 40'. This is accomplished by the coaction of the resistors 14, 14' with the constant current devices 16, 16' in a manner similar to that of the resistor 14a and the constant current devices 16a of Figure 1, as previously described.

The conductor 47 connecting the control grids of the tubes 17, 17' to a point between the resistors 44, 45 operates to automatically stabilize the interstage coupling circuit and the second stage of the amplifier against drift, such as caused by variations in tube characteristics. Any change tending to cause drift and evidencing itself as a change in potential at the point of connection of the conductor 47 between the resistors 44, 45, will appear as a change in the control grid-cathode potential of the tubes 17, 17'. If, for example, a rise in potential on the conductor 47 were to occur, the anode current of the tubes 17, 17' would be increased, this would reduce the anode potential of the tubes 17, 17' and therefore the grid potential of the tubes 40, 40', thereby reducing the cathode potential of the tubes 40, 40' so that the potential of the conductor 47 will be reduced by an amount just sufficient to compensate for its original potential rise. It is this self-stablization, occurring between the coupling circuit and the following stage of the amplifier, which permits cascading of a number of units each consisting of a coupling circuit and a stage of amplification, without danger of long-time drifts rendering the complete amplifier unusable.

Various changes may be made in the forms of invention herein shown and described without departing from the spirit of the invention or the scope of the following claims.

The invention described herein may be manufactured and used by or for the Government of the United States of America for governmental purposes without the payment of any royalties thereon or therefor.

I claim:

1. In a system for maintaining zero signal-potential-drop between different average potential levels, one of said average potential levels having a signal-potential imposed thereon, an impedance connected between said potential levels, and a constant-current device connected to the impedance and maintaining a constant flow of current through the impedance, whereby the signal potential is transferred through the impedance without attenuation.

2. In a voltage-level transformer for varying the average potential level of a signal impressed on a given source of potential, an electron tube including a cathode, a control grid and an anode, an impedance connected between said anode and said potential source, an impedance connected between said cathode and an electrode potential source at zero signal-potential, a condenser connected between the anode and said given source of potential, an impedance connected between the cathode and said given potential source, and means maintaining the control grid at a fixed operating potential.

3. In a voltage-level transformer for varying the average potential level of a signal impressed on a given source of potential, an electron tube including a cathode, a control grid and an anode, an impedance connected between said anode and said potential source, an impedance connected between said cathode and an electrode potential source at zero signal-potential, an impedance connected between the cathode and said given potential source, and means maintaining the control grid at a fixed operating potential.

4. In a multistage amplifier for the passage of alternating current or direct current signals, an interstage coupling comprising an impedance connected between the output of a given stage of amplification and the input of the next stage and means maintaining a constant flow of current through the impedance to provide the electrode-potential changes necessary for proper cascaded amplification and to obtain zero signal-potential-drop across the impedance.

5. In a multistage amplifier for the passage of alternating or direct current signals, an interstage coupling comprising an impedance connected between the output of a given stage of amplification and the input of the next stage, and a constant-current device comprising an electron tube including a cathode, a control grid and an anode, said anode connected to the input of said next stage, an impedance connected between said cathode and an electrode potential source at zero signal potential, an impedance connected between said cathode and the output of said given stage, a condenser connected between the anode and the output of said given stage of amplification, and means maintaining the control grid at a fixed operating potential.

6. In a multistage amplifier for the passage of alternating or direct current signals, an interstage coupling comprising an impedance connected between the output of a given stage of amplification and the input of the next stage, and a constant-current device comprising an electron tube including a cathode, a control grid and an anode, said anode connected to the input of said next stage, an impedance connected between said cathode and an electrode potential source at zero signal potential, an impedance connected between said cathode and the output of said given stage, and means maintaining said control grid at a fixed operating potential.

7. In a push-pull direct current or alternating current multistage amplifier for use with balanced or unbalanced input signals, interstage coupling means for both phases of the signal to be amplified comprising, for each phase of said signal, an impedance connected between the output of a given stage of amplification and the input of the next stage of amplification and means maintaining a constant flow of current through the impedance to provide the electrode-potential changes necessary for proper cascaded amplification and to obtain zero signal-potential-drop across the impedance.

8. In a push-pull direct current or alternating current multistage amplifier for use with balanced or unbalanced input signals, interstage coupling means for both phases of the signal to be amplified comprising, for each phase of said signal, an impedance connected between the output of a given stage of amplification and the input of the next stage of amplification, and a constant-current device comprising an electron tube including a cathode, a control grid and an anode, an impedance connected between said anode and the output of said given stage, an impedance connected between said cathode and an electrode-potential source at zero signal-potential, a condenser connected between said anode and the output of said given stage, an impedance connected between said cathode and the output of said given stage, and means responsive to circuit variations tending to cause drift for applying to said control grid a signal at the proper electrode-potential level for varying the plate resistance of said electron tube by an amount sufficient to neutralize said circuit variations.

9. In a push-pull direct current or alternating current multistage amplifier for use with balanced or unbalanced input signals, interstage coupling means for both phases of the signal to be amplified comprising, for each phase of said signal, an impedance connected between the output of a given stage of amplification and the input of the next stage of amplification, and a constant-current device comprising an electron tube including a cathode, a control grid and an anode, an impedance connected between said anode and the output of said given stage, an impedance connected between said cathode and an electrode-potential source at zero signal-potential, an impedance connected between said cathode and the output of said given stage, and means responsive to circuit variations tending to cause drift for applying to said control grid a signal at the proper electrode-potential level for varying the plate resistance of said electron tube by an amount sufficient to neutralize said circuit variations.

10. The method of maintaining a constant current through an impedance connected between first and second average potential levels, said first average potential level having a signal-potential imposed thereon, which consists in delivering to that end of the impedance which is connected to said second average potential-level a potential increment which is equal in phase and magnitude to the signal-potential imposed on said first average potential-level, thus maintaining a constant current through the impedance which does not change with signal-potential excitation.

GEORGE W. COOK.